Sept. 2, 1952 W. A. BIHARY Re. 23,542

APPARATUS FOR PREPARING MASKING APRONS

Original Filed Dec. 10, 1948 2 SHEETS—SHEET 1

Inventor

William A. Bihary

By Cushman, Albert, Darby & Kinney

Attorneys

APPARATUS FOR PREPARING MASKING APRONS

Original Filed Dec. 10, 1948 2 SHEETS—SHEET 2

Inventor

William A. Bihary

By Carpenter, Abbott, Coulter & Kinney

Attorneys

Reissued Sept. 2, 1952

Re. 23,542

UNITED STATES PATENT OFFICE 23,542

APPARATUS FOR PREPARING MASKING APRONS

William A. Bihary, Miami, Fla., assignor to Minnesota Mining & Manufacturing Company, St. Paul, Minn., a corporation of Delaware Original No. 2,522,773, dated September 19, 1950, Serial No. 64,482, December 10, 1948. Application for reissue June 10, 1952, Serial No. 292,777

4 Claims. (Cl. 154—1.6)

Figure 1:
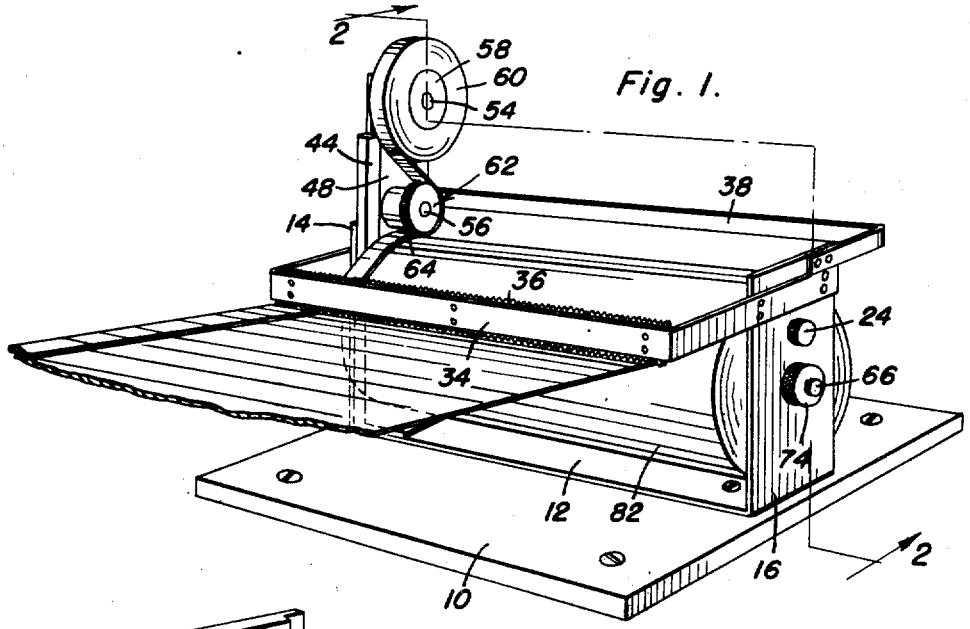

Matter enclosed in heavy brackets [ ] appears in the original patent but forms no part of this reissue specification; matter printed in italics indicates the additions made by reissue.

This invention relates to apparatus for preparing masking aprons such as are used in the finishing of automobiles and other articles where it is desirable to use an apron for masking out portions of the surface, particularly when a spray gun is used for applying lacquer and the like to the surface to be finished.

The primary object of this invention is automatically to connect a strip of adhesive tape with the masking apron as the latter is drawn off of a supply roll of masking paper.

Apparatus of the type to which this invention relates is exemplified in United States Patents Nos. 1,963,666; 2,012,014; and 2,374,103.

Another object of the present invention is to simplify the construction of tape-applying apparatus and to prevent the tape from adhering to portions of the supply roll of paper other than that from which the apron is being formed.

Still another object is to utilize the force of gravity in pressing the adhesive tape against the masking paper, and further to regulate the distance which the adhesive tape overhangs the edge of the masking paper.

The above and other objects may be attained by employing this invention which embodies among its features a carriage mounted for vertical movement adjacent one end of a supply roll of masking paper, means on said carriage to support a roll of adhesive tape in overhanging relation to the supply roll of masking paper, and a pressure roll carried by the carriage below the roll of adhesive tape beneath which tape from the roll of adhesive tape is directed and pressed against the roll of masking paper by the weight of the carriage and the mechanism carried thereby.

Other features include means adjacent the end of the supply roll of masking paper remote from the carriage for engaging said roll of paper and advancing it toward the pressure roll, and means engaging the end of the supply roll of masking paper beneath the pressure roll yieldingly to hold said supply roll against the adjustable means.

Still other features include an annular peripheral flange on the pressure roller adjacent the end thereof which overhangs the supply roll by which the adhesive tape is pressed into contact with the paper on the supply roll in spaced relation to the edge thereof.

Figure 4:
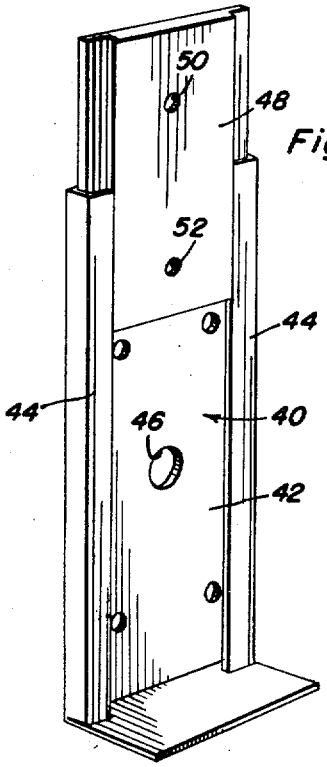
Figure 5:
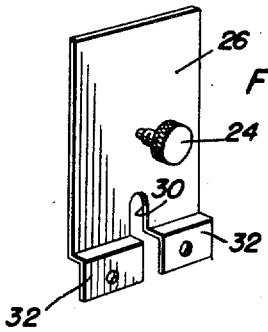
Figure 2:
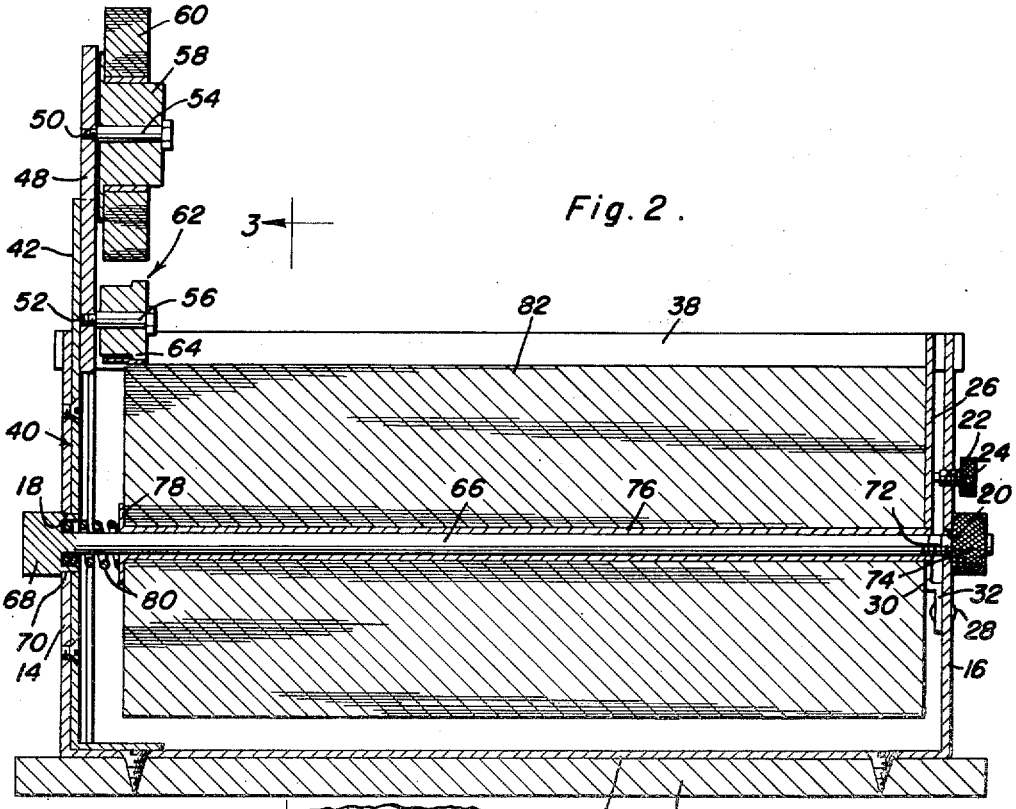
Figure 3:
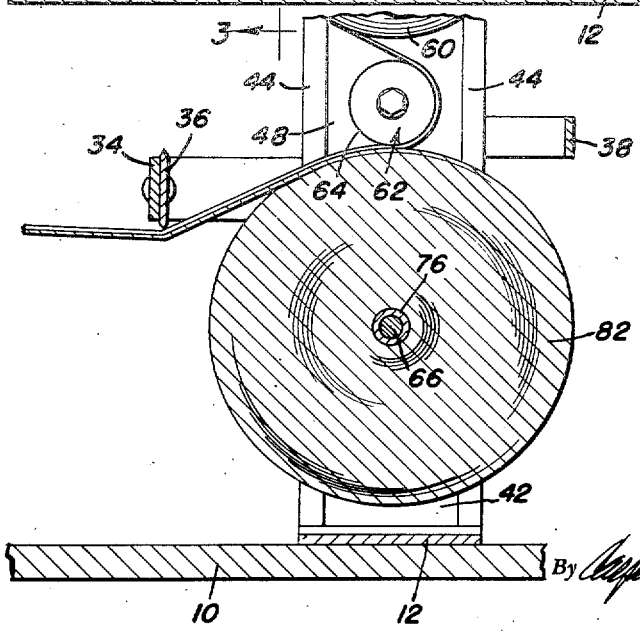

In the drawings:

Figure 1 is a perspective view of an apparatus for preparing masking aprons, embodying the features of this invention, Figure 2 is a longitudinal sectional view taken substantially along the line 2—2 of Figure 1, Figure 3 is a transverse sectional view taken substantially along the line 3—3 of Figure 2, Figure 4 is a perspective view of one of the supporting standards for the roll of masking paper showing the carriage mounted thereon, and Figure 5 is a perspective view of the guide plate for the supply roll of masking paper.

Referring to the drawings in detail, a base 10 is equipped with a U-shaped frame 12 having upstanding legs 14 and 16 which are pierced intermediate their ends by aligning openings 18 and 20, respectively. It is to be noted that the opening 18 is of greater diameter than the opening 20 for a purpose to be more fully hereinafter described.

Formed in the leg 16 above the opening 20 is an internally screw-threaded opening 22 for the reception of the threaded end of a thumb screw 24 which passes through the leg 16 and bears against a guide plate 26 which is riveted or otherwise secured as at 28 to the leg 16 on the inner side thereof below the opening 20. As illustrated in Figure 5, the guide plate 26 is bifurcated adjacent its lower end, as at 30, and is provided with offset portions 32 which serve to hold the plate 26 in spaced relation to the leg 16, as will be readily understood upon reference to Figure 2. Fixed to the legs 14 and 16, adjacent their upper ends, is a substantially horizontally extending U-shaped frame 34, to the bight portion of which is fixed a serrated blade 36, beneath which paper leaving the supply roll of masking paper passes to enable separate aprons to be severed from the supply roll. A similar, substantially U-shaped frame 38 is secured to the legs 14 and 16 adjacent their upper ends and projects in a direction opposite the frame 34 to form a reinforcing and stiffening structure.

Secured to the leg 14 of the frame 12 is a vertical guide member designated generally 40 which comprises a standard 42 which is provided at opposite side edges with substantially U-shaped flanges 44, and formed in the standard 42 intermediate its upper and lower ends is an opening 46 which aligns with the opening 18 in the leg 14, as will be readily understood upon reference to Figure 2. Mounted for vertical sliding movement on the standard 14 between the guide flanges 44 is a carriage 48 which is provided near its upper and lower ends with internally screw-threaded openings 50 and 52, respectively, for the reception of the threaded ends of bearing studs 54 and 56. (Figure 2.) Mounted for rotation on the upper bearing stud 54 is a flanged core 58 upon which a roll of adhesive tape 60 is supported, and mounted for rotation on the stud 56 directly below the core 58 in a pressure roller designated generally 62. This pressure roller is provided adjacent its end remote from the carriage 48 with an outstanding peripheral flange 64, the periphery of which is preferably knurled for frictional contact with the tape as it leaves the roll 60.

A support spindle 66 is equipped at one end with a head 68 which is shouldered, as at 70, to enter the opening 18 in the leg 14 of the frame 12, while the opposite end of the spindle 66 is externally screw-threaded, as at 72, for entrance into an internally screw-threaded nut 74 which, as illustrated in Figure 2, bears against the outer side of the leg 16 of the frame 12, thus to hold the spindle 66 in a horizontal position. Mounted for rotation on the spindle 66 is a thimble 76 provided at one end with an outstanding annular flange 78, and positioned about the spindle 66 between the flange 78 of the thimble 76 and the head 68 of the spindle 66 is a compression coil spring 80 which bears against the head 68 and flange 78 yieldingly to urge the thimble 76 toward the guide plate 26. The thimble 76 is preferably of a diameter readily to fit into the central opening of a roll of masking paper 82, so that the roll may be supported for rotation on the spindle 66.

In use, a roll 82 of masking paper is mounted on the thimble 76, and the thimble is then placed between the legs 14 and 16 of the frame 12 and the spindle 66 entered through the opening 18 and the bore of the thimble 76, to pass through the opening 20 in the leg 16. The nut 74 is then threaded on the threaded end 72 of the spindle 66, and the roll 82 of masking paper will be held in the machine in proper position for operation. The spring 80 yieldingly urges the roll of paper against the guide plate 26 which, in turn, is yieldingly held against the end of the thumb screw 24, so that by turning the thumb screw, the guide plate 26 may be moved to shift the roll 82 of masking paper longitudinally on the spindle 66. The roll 60 of adhesive tape having been mounted on the core 58, the machine is ready for operation. A portion of the adhesive tape is unrolled from the roll 60 and passed around the pressure roller 62 as illustrated in Figure 3 so that its adhesive surface is turned toward the roll 82 of masking paper. The tape is pressed against the roll 82 of masking paper by the knurled flange 64 of the pressure roller 62 and as the paper apron is unrolled from the roll of masking paper 82, it will be obvious that it will carry with it a length of adhesive tape which will overhang one edge of the paper as it leaves the roll so that when an apron is severed from the roll by the serrated blade 36, it will have firmly fixed to its edge a strip of adhesive tape which may be employed to support the apron in masking relation to the object being finished. Owing to the fact that the flange 64 is spaced inwardly from the edge of the roll 82 as illustrated in Figure 2, it will be obvious that the pressure on the adhesive tape is applied on the edge thereof nearest the center of the roll 82, and in spaced relation to the end of the roll 82 so as to avoid any possibility of forcing the adhesive tape into engagement with any portion of the roll 82 other than that to which it is to be attached.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. An apparatus for preparing masking aprons comprising a base, a U-shaped frame secured at its web portion to said base, a masking paper roll, means for rotatably retaining said roll on the legs of said frame spaced from said base, a vertical support secured to one leg of said frame, a carriage slidably and guidingly mounted on said support, an adhesive tape roll rotatably mounted on said carriage, a presser roll rotatably mounted on said carriage beneath said adhesive tape roll, said pressure roll including a peripheral flange adapted to contact the tape and urge it against the masking paper roll, and means for adjusting said masking paper roll relative to said pressure roll.

2. The combination of claim 1 wherein said first-named means includes a thimble receiving said masking paper roll, said thimble having a flange at one of its ends, and a spindle positioned in said thimble and journaled at its ends in the legs of said frame.

3. The combination of claim 2 wherein said last-named means includes a guide plate secured at one of its ends to the other leg of said frame and adapted to press against said masking paper roll, a set screw through said other leg bearing against said guide plate, and a spring about said spindle interposed between said one leg and the thimble flange urging said masking paper roll towards said guide plate.

*4. An apparatus for preparing masking aprons comprising a frame, means for mounting a roll of masking paper in the frame for rotation about an axis, a carriage mounted for gravitational movement toward the said axis, means for rotatably mounting a roll of adhesive tape on the carriage, a presser roller rotatably mounted on the carriage in a position to bear against the masking paper roll with a length of withdrawn tape between the peripheries of the presser roller and the roll of paper to urge the tape into adhesive contact with the paper, and means for lateral positional adjustment of the roll of paper and the roll of tape relative to each other.*

WILLIAM A. BIHARY.

REFERENCES CITED

The following references are of record in the file of this patent or the original patent:

UNITED STATES PATENTS

| Number | Name | Date |
|---|---|---|
| 1,590,371 | Haren | June 29, 1926 |
| 1,963,666 | McCarthy et al. | June 19, 1934 |
| 2,012,014 | McCarthy | Aug. 20, 1935 |
| 2,082,114 | Littlefield | June 1, 1937 |
| 2,374,103 | Johnson | Apr. 17, 1945 |
| 2,571,978 | Watson | Oct. 16, 1951 |